United States Patent [19]

Braun et al.

[11] Patent Number: 4,872,185
[45] Date of Patent: Oct. 3, 1989

[54] SIGNAL TRANSMISSION METHOD

[75] Inventors: Walter Braun, Wettingen; Joachim Habermann, Baden, both of Switzerland

[73] Assignee: BBC Brown Boveri AG, Baden, Switzerland

[21] Appl. No.: 210,993

[22] Filed: Jun. 24, 1988

[30] Foreign Application Priority Data

Sep. 7, 1987 [CH] Switzerland ............ 2613/87

[51] Int. Cl.$^4$ ............................................. H04B 7/00
[52] U.S. Cl. ...................................... 375/106; 375/95
[58] Field of Search ................. 329/50, 104, 110; 328/151; 375/52, 57, 83, 97, 106, 110, 95, 96; 364/724.10, 724.11

[56] References Cited

U.S. PATENT DOCUMENTS

4,379,284  5/1983  Boykin .......................... 375/83
4,453,259  6/1984  Miller .......................... 375/106

Primary Examiner—Benedict V. Safourek
Attorney, Agent, or Firm—Oblon, Spivak, McClelland, Maier & Neustadt

[57] ABSTRACT

In a signal transmission method, a sequence of equally distributed statistically uncorrelated symbols having a symbol duration $T_S$ is converted, in a transmitter, into a frequency baseband signal by means of a given CPM method, the frequency baseband signal is transmitted to a signal receiver by means of a carrier oscillation and the receiver is synchronized with respect to the frequency baseband signal. The signal receiver is synchronized in such a manner that, in a number N of time windows the starting times of which are displaced by an integral multiple of the symbol duration $T_S$ referred to a given reference time $t_R$ and the length of which in each case corresponds to the symbol duration $T_S$, the frequency baseband signal is sampled in a number K of subintervals (1A, 1B, 1C, 2A, ...) per time window, dispers ions ($\sigma_A$, $\sigma_B$, $\sigma_C$) are calculated for sampled values from subintervals (1A, 2A, 3A, ...) corresponding to one another and a sampling time $T_A$ is derived from the location of the smallest one of the dispersions in time. The N time windows are divided into two groups (1A, 1B, 1C, 3A, 3B, ...; 2A, 2B, 2C, 4A, 4B ...) and the dispersions ($\sigma_A$, $\sigma_B$, $\sigma_C$) are separately determined for each group.

7 Claims, 6 Drawing Sheets

SIGNAL TRANSMISSION METHOD

TECHNICAL FIELD

The invention relates to a signal transmission method in which, in a transmitter, a sequence of equally distributed statistically uncorrelated symbols, which have a symbol duration $T_S$, are converted into a frequency baseband signal by means of a given CPM method, the frequency baseband signal is transmitted by means of a carrier oscillation to a receiver, the receiver is synchronised with respect to the frequency baseband signal in such a manner that, in a number N of the time windows the starting times of which, referred to a reference time $t_R$, are displaced by an integral multiple of the symbol duration $T_S$ and the length of which in each case corresponds to the symbol duration $T_S$, the frequency baseband signal is sampled in a number K of subintervals per time window, from subintervals corresponding to one another dispersions are calculated for sampled values and a sampling time $T_A$ is derived from the location of the smallest of the dispersions in time.

PRIOR ART

CPM (Continuous Phase Modulation) methods are particularly suitable for the transmission of digital data. In principle, they allow a low susceptibility to interference to be achieved with a narrow bandwidth. This advantage mainly becomes apparent when a frequency pulse extending over several symbols is used in the transmitter.

Accurate synchronisation of the signal receiver with respect to the frequency baseband signal represents an important step in such a signal transmission method. In this connection, it is important to perform a periodic sampling of the frequency baseband signal at a correct time, the so-called sampling time.

For this purpose patent application CH 176/86-7 proposes a method in which a number of time windows of a given length are subdivided into subintervals, the frequency baseband is sampled in each subinterval, dispersions are calculated from the values belonging to corresponding subintervals and the sampling time is determined from the location of the smallest of the dispersions.

The disadvantage of this method lies in the fact that the susceptibility to interference of the synchronisation increases especially in the case of frequency pulses which extend over several symbols and therefore lead to a spectrally efficient signal transmission method.

REPRESENTATION OF THE INVENTION

It is therefore the object of the present invention to develop a method of the type initially mentioned in such a manner that it is also possible to synchronise the signal receiver accurately, rapidly and with a low susceptibility to inference in the case of signal transmission methods, the frequency pulse of which extends over several symbols. The way of achieving the object in accordance with the invention is apparent from the characterizing clause of the main claim. Preferred embodiments of the invention are found in the subclaims.

The invention is based on the finding that a phase diagram obtained by sampling the frequency baseband signal at particular periodic times can be divided into two simple characteristic phase diagrams if the sampling times used as a basis are suitably combined into two separate groups, all sampling times which are displaced by a multiple of twice the period of the sampling referred to a given reference time $t_R$ being combined in one group and all remaining sampling times being combined in the other group.

This basic finding also results in new requirements for the shape of the frequency pulse in the transmitter. This is now determined in such a manner that the signal transmission method, in addition to the previously known characteristics such as, for example, of low out-of-band power, additionally exhibits low susceptibility of the synchronisation of the signal receiver to interference.

BRIEF DESCRIPTION OF THE DRAWINGS

In the text which follows, the invention will be described in greater detail in connection with the drawing, in which.

APPROACHES TO CARRYING OUT THE INVENTION

The invention can be implemented in the most varied ways. For this reason, the principle on which it is based will first be explained.

A frequency baseband signal generated by means of a CPM method has the property, among other things, that it can only assume one value from a small set of possible given discrete values at particular times $T_K$ which are periodic with a given time interval $T_S$. The possible discrete values can be related to a corresponding phase which can be represented as a phase point in a phase diagram. If it is assumed that the frequency baseband has been created from a sequence of statistically uncorrelated symbols which occur with equal frequency, a frequency of occurrence which is characteristic of the CPM method can be additionally determined for each phase point.

Figure 1A:
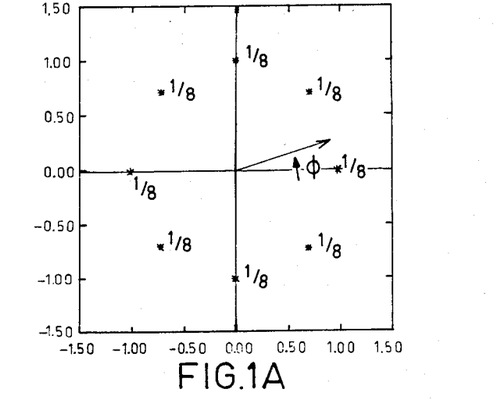
FIG. 1a shows a time-invariant phase diagram of a given signal transmission method.

FIG. 1A shows as example a so-called time-invariant phase diagram. (In general, a phase diagram is obtained by representing the values, which are assumed by the frequency baseband signal at particular times in the complex representation, in the complex plane). In this special case, the 8 possible phase points all have the same frequency of occurrence, which is ⅛, and a constant distance between one another.

If then a new phase diagram is generated, but plotting only those phase values which are assumed at a time displaced by an even-numbered multiple of the symbol duration $T_S$ with respect to a given reference time $t_R$, a so-called even phase diagram is obtained which has new unexpected characteristics.

Figure 1B:
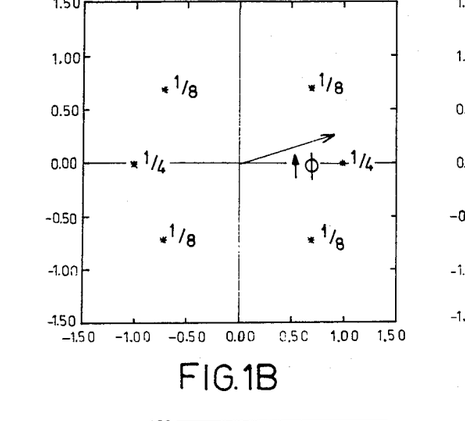
FIG. 1b shows an even phase diagram of this signal transmission method.

FIG. 1B shows the even phase diagram associated with FIG. 1A. All the possible phase points do not occur here nor do the remaining ones have the frequencies specified in the time-invariant phase diagram. Instead, two focal points can be recognised, namely at $\pi = 0$ and at $\Phi = \pi$.

Figure 1C:
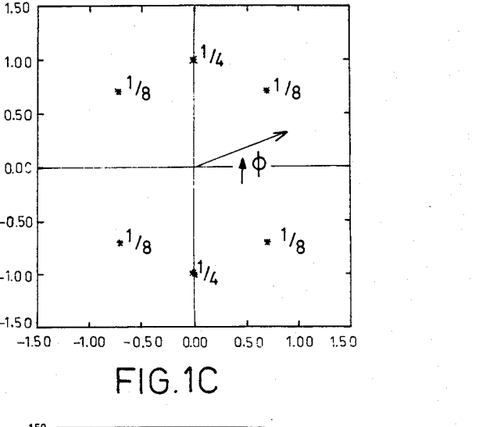
FIG. 1c shows an odd phase diagram of this signal transmission method.

FIG. 1C shows a so-called odd phase diagram which is complementary to FIG. 1B and which is created on the basis of the phase values which are assumed at a time displaced by an odd-numbered multiple of the symbol duration $T_S$ with respect to the same reference time $t_R$. It should be noted that the odd phase diagram derives from the even one by a constant phase rotation which is $\pi/2$ in this example.

In the text which follows, the way will be described in which this fact can be utilised to benefit a synchronisation method. In principle, a synchronisation method has the task of determining the times at which the phase values of the frequency baseband signal coincide with one of the phase points occurring in the time-invariant phase diagram. Since the frequency baseband signal becomes noisy during the transmission from the transmitter to the signal receiver, statistical analysis methods have to be used. To simplify and thus to accelerate such analysis methods, the frequency baseband signal is preprocessed so that the corresponding time-invariant phase diagram now only has a fraction of the phase points of the original phase diagram.

It can be shown with reference to FIG. 1B how the frequency baseband signal is preprocessed in accordance with the invention. It can be seen in this Figure that this even phase diagram has two so-called basic phase points, namely at $\Phi = 0$ and $\phi = \pi$, around which in each case two so-called interference phase points are grouped, namely at $\Phi = -\pi/4$ and at $\Phi = +\pi/4$ and $\Phi = 3\pi/4$ and at $\Phi = 5\pi/4$. The basic phase points are then imaged by means of a suitable imaging method, for example by raising the frequency baseband signal to a power of magnitude 2, on a so-called reduced phase point, in this special case $\Phi = 0$. In this imaging method, the interference phase points move to the vicinity of this new, reduced phase point. The dispersion of the interference phase points with respect to the reduced phase point in such a reduced phase diagram is an important parameter of a synchronisation method according to the invention.

Figure 2:
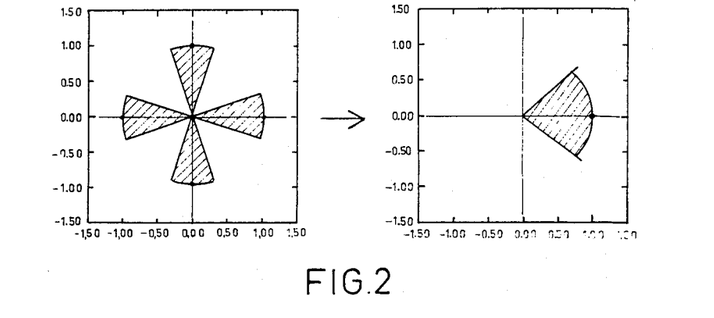
FIG. 2 shows a diagrammatic representation of the effect of a preprocessing type of imaging method.

FIG. 2 illustrates the effect of the preprocessing imaging, in which, for example, an even phase diagram is transformed into a reduced phase diagram. Let the even phase diagram have a number p of basic phase points (for example p=4). For each of the basic phase points, a phase region (drawn shaded) can be specified in which the interference phase points associated with the respective basic phase point are located. These p phase regions (left-hand side of FIG. 2) are then imaged by the imaging method on a single reduced phase region (right-hand side of FIG. 2).

It should be noted that the odd phase diagram can also be reduced by means of the same imaging method. However, the two reduced phase diagrams are not identical but can be made to overlap by simple means.

The required optimum time $T_K$ has the characteristic that the dispersion of the phase values of the frequency baseband signal with respect to the basic phase point of the reduced phase diagram is minimum in comparison with a corresponding dispersion at any other time.

Figure 3:
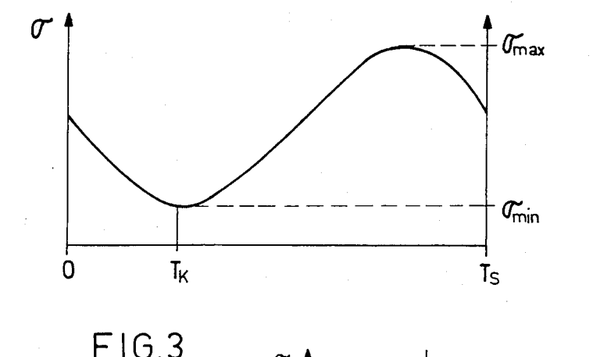
FIG. 3 shows a representation of the dependence of the dispersion of the phase of the frequency baseband signal on the sampling time.

FIG. 3 represents the dispersion of the phase values as a function of time in an interval of length $T_S$. The dispersion moves between a maximum dispersion $\sigma_{max}$ and a minimum dispersion $\sigma_{min}$. The greater the difference between the two values, which is called the decision range, the higher the noise immunity of the operation of the synchronisation method.

Figure 4:
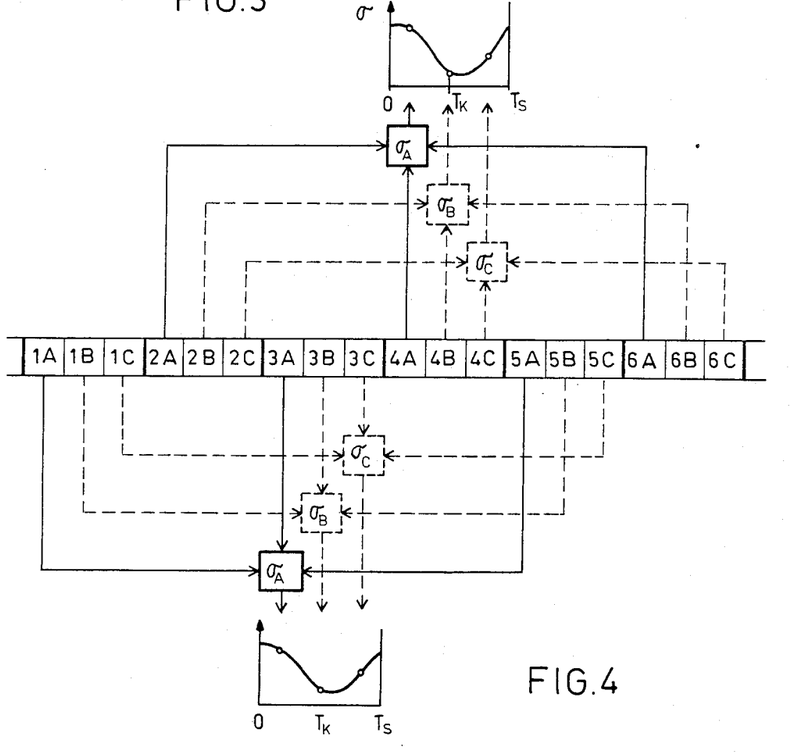
FIG. 4 shows a diagrammatic overview of a synchronisation method according to the invention.

FIG. 4 shows a diagrammatic representation of a preferred embodiment of the synchronisation method according to the invention. It is assumed that a frequency baseband signal has been sampled in 6 successive time windows (identified by the numbers 1 to 6) of length $T_S$ in three subintervals which are equal in each case (identified by the letters A, B, C). These 18 sampled values are divided into two groups, the first one consisting of the 9 values 1A, 1B, 1C, 3A, 3B, 3C, 5A, 5B, 5C, and the second one consisting of the 9 values 2A, 2B, 2C, 4A, 4B, 4C, 6A, 6B, 6C. For both groups, 3 dispersions $\sigma_A$, $\sigma_B$, $\sigma_C$ corresponding to the subintervals A, B, C are in each case calculated. The subinterval having the smallest dispersion, in this case subinterval B, determines the optimum time $T_K$. The sampling time $T_A$ is dependent on the CPM method implemented in the transmitter and is either equal to $T_K$ or to $T_K + T_S/2$.

In principle, it is sufficient to process one of the two groups of sampled phase values. If the values of both groups are used, the statistics are improved with an observation time of equal length. In addition, it is not necessary for both groups to exhibit an equal number of time windows. It is only essential that the dispersion values of corresponding subintervals are combined with the correct weighting.

The method just described can be generalised without restriction to a freely selectable number N of time windows having a freely selectable subdivision into subintervals.

In the text which follows, a preferred embodiment of the invention is described with reference to a particular block diagram.

Figure 5:
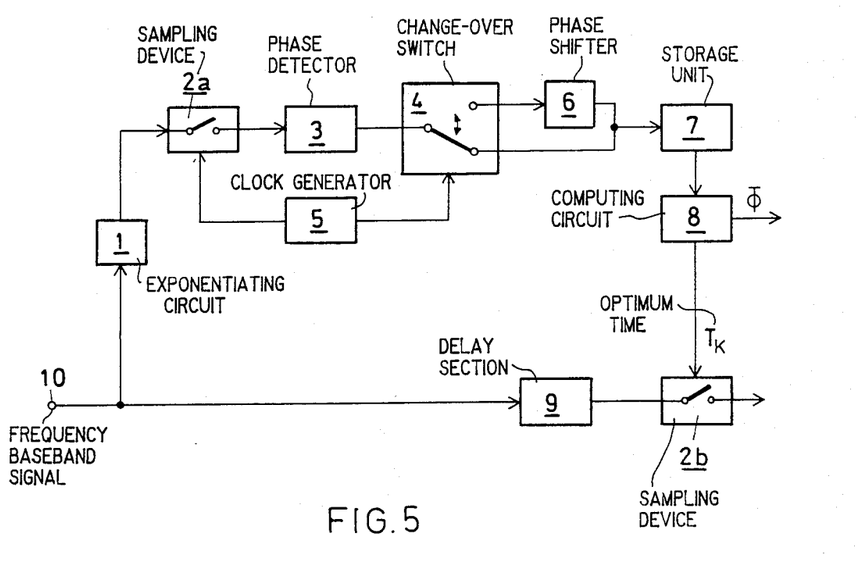
FIG. 5 shows a block diagram of a synchronisation circuit of a signal receiver.

FIG. 5 shows a block diagram of a synchronisation circuit of signal receiver in accordance with the principle of the invention. The signal, with respect to which the receiver is to be synchronised, is a frequency baseband signal 10 such as is present after the demodulation of a carrier oscillation. This signal is supplied to an exponentiating circuit 1 and sampled by a sampling device 2a, the output of which, after phase detection by the phase detector 3, is applied to a change-over switch 4. The change-over switch 4 divides the sampled values into two channels. One channel is subjected to intermediate processing by a phase shifter 6 and then supplied to a storage unit 7, the other channel is directly supplied to the storage unit 7. A computing circuit 8 determines the optimum time $t_K$ which is conveyed to a sampling device 2b. This sampling device 2b samples the frequency baseband signal, which is delayed by a delay section 9, at a sampling time $T_A$ which is optimum for the subsequent signal processing method of the receiver.

The sampling device 2a and the change-over switch 4 are controlled by a clock generator 5. This subdivides a time window of the length of one symbol duration $T_S$ into a number K of subintervals and periodically repeats this process at the time interval $T_S$.

The sampling device 2a samples the signal coming from the exponentiating circuits 1 in each of the K subintervals of one time window. The change-over switch 4 switches between the two channels with a period of length $T_s$ so that in each case all values of the signal sampled in the same time window go to the same channel. The phase shifter 6 shifts the phase values present at its input by a constant value which is matched to the CPM method implemented in the transmitter. The use of a phase shifter 6 corresponds to a preferred embodiment of the invention which leads to a simplification of the data editing implemented in the subsequent computing circuit 8.

The sampled values of a given number N of time windows are stored in the storage unit 7. The content of the storage unit 7 is periodically updated, that is to say values no longer needed are removed from storage and new values are stored.

The computing circuit 8 determines the optimum time $T_K$ from the $N \times K$ stored values. To be able to determine the variances, mean values must first be calculated since the phase of the signal changes with time, either due to the transmission of the signal to the receiver or, for example, because the carrier frequency oscillators in the transmitter and in the receiver are not identical. Once the optimum time $T_K$ has then been determined, the corresponding mean value can be passed on, for example to a phase decoder (not drawn in FIG. 5) as mean phase value Φ. It should be noted that the mean phase value can be determined at the same time as the optimum sampling time $T_K$ without additional effort. This is a further advantage of a signal transmission method using a synchronisation method according to the invention.

Due to the use of the phase shifter 6, it is no longer necessary to use different algorithms for processing the phase values belonging to different groups for calculating the dispersion. For each of the K subintervals, the dispersion of the corresponding phase values stored in the storage unit 7 can then be calculated and the minimum of the dispersion can be determined.

The only purpose of the delay section 9 is to calibrate the time needed for determining the optimum time $T_K$ in the required manner. If the synchronisation method observes the frequency baseband signal, for example during a time interval of length $N \times T_S$, it is recommended to introduce a time displacement of, for example, $N \times T_S/2$ by means of the delay section 9.

A second illustrative embodiment relates to a signal transmission method which, in accordance with a preferred embodiment of the invention, uses in the transmitter a frequency pulse which renders the synchronisation of the signal receiver particularly immune to interference.

The interference immunity of a synchronisation method according to the invention can be characterized by a decision range. In the representation of FIG. 3, the decision range corresponds to the difference between $\sigma_{max}$ and $\sigma_{min}$. This is because the interference introduced by the channel raises the $\sigma_{min}$ dispersion and as the magnitude of this interference increases, it becomes more difficult to determind the optimum time $T_K$.

Since $\sigma_{min}$ is given by the dispersion of the interference phase points with respect to the basic phase points, ways for rendering the synchronisation immune to interference become available in that a frequency g(t) is determined in the transmitter in such a manner that the decision range becomes maximum.

In mathematical terms, it is a matter of minimising a functional dependent on the frequency pulse, which specifies the dispersion of the interference phase points in the phase diagram. The way to achieving this object can be found, for example, by means of the variation calculation and results in the required frequency pulse. By introducing suitable constraints, the frequency pulse can be provided with further characteristics which are advantageous for the signal transmission method. Some preferred constraints are specified in the text which follows.

It it generally desirable to obtain a signal transmission method which exhibits an efficient power density spectrum. For this reason, it is preferable to find a frequency pulse which has a power density spectrum G(f) which, together with its derivation, disappears as an absolute value at a frequency $f = \frac{1}{2}T_S$.

A further preferred requirement for the frequency pulse is that it varies with mirror symmetry with respect to its centre. This results in, for example improved distance characteristics for the signal transmission method, that is to say lower error probabilities in the signal analysis in the signal receiver.

In the text which follows, it is intended to compare the characteristics of a frequency pulse, called optimum, found in the manner described above, with that of a conventional frequency pulse. Both frequency pulses have a length L=5, that is to say they extend over a period corresponding to five times the symbol duration $T_S$.

Figure 6:
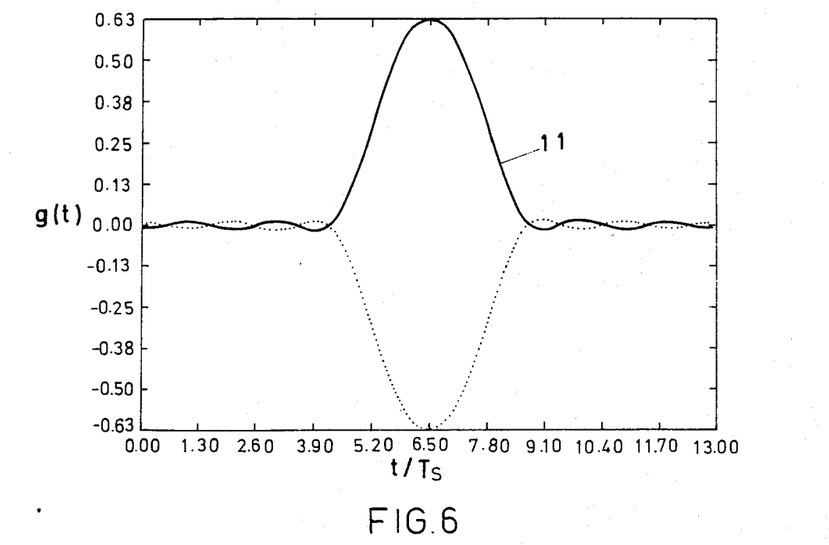
FIG. 6 shows a representation of a known, much-used frequency pulse.

FIG. 6 shows the conventional frequency pulse 11 used for the comparison. Its spectrum is that of a raised cosine. Such a frequency pulse is generally denoted as 5SRC pulse (Spectral Raised Cosine, length L=5).

Figure 7:
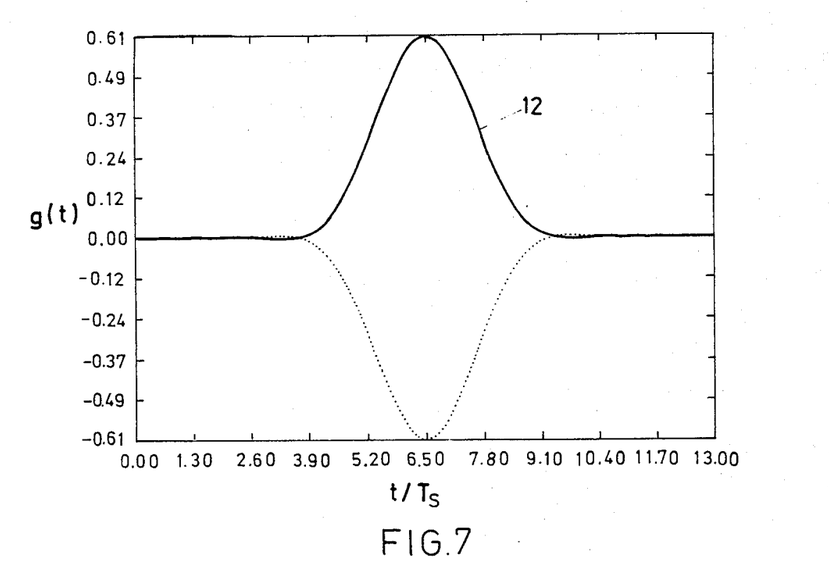
FIG. 7 shows a representation of an optimum frequency pulse according to the invention.

FIG. 7 shows a possible optimum frequency pulse 12 of length L=5 as produced due to the following constraints:

1. Symmetry of the frequency pulse
2. Disappearance of the spectrum G(f) of the frequency pulse at frequencies $f = \frac{1}{2}T_S$.

Both in FIG. 6 and in FIG. 7, a relative time $t/T_S$ is plotted along the abscissa and the value of the frequency pulse g(t) as a pure number along the ordinate.

Figure 8:
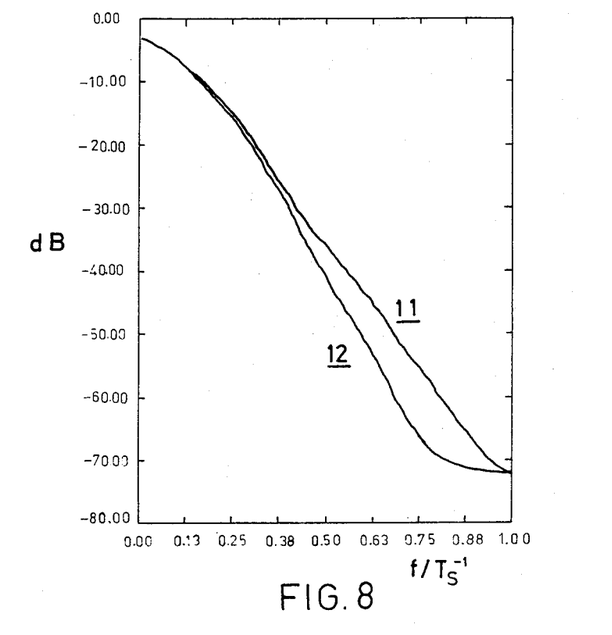
FIG. 8 shows a representation of the out-of-band power of a signal transmission method with a known frequency pulse and with a frequency pulse according to the invention, respectively.

FIG. 8 represents the relative out-of-band power of the two frequency pulses from FIG. 6 and FIG. 7. It indicates the fraction of the signal power which is outside a particular bandwidth. A relative frequency $f/T_S$-1 is plotted along the abscissa and the relative out-of-band power in dB along the ordinate. It can be clearly seen that the optimum frequency pulse 12, compared with the 5SRC pulse 11, has a spectrally more efficient power density spectrum, that is to say that the out-of-band power decreases more steeply and more rapidly with increasing relative frequency.

As has previously been mentioned, the interference sensitivity of the synchronisation method can be estimated by the magnitude of the decision range, that is to say by the difference between maximum dispersion $\sigma_{max}$ and minimum dispersion $\sigma_{min}$. If a signal transmission method with binary symbols, a modulation index $h=\frac{1}{2}$ and a synchronisation method as described in the first illustrative embodiment, where the exponent $p=2$, is assumed, the following values are obtained:

|  | 5 SRC pulse | Optimum frequency pulse |
|---|---|---|
| $\sigma_{max}$ | 0.7684 | 0.7952 |
| $\sigma_{min}$ | 0.4708 | 0.5012 |
| Decision range | 0.2976 | 0.2940 |

The decision range is approximately of equal magnitude in both cases. (The fact that $\sigma_{min}$ is greater with the optimum frequency pulse 12 is due to the fact that the 5SRC pulse does not meet some constraints). In consequence, the optimum frequency pulse 12 has a lower out-of-band power with the same decision range and is therefore clearly to be preferred.

Figure 9:
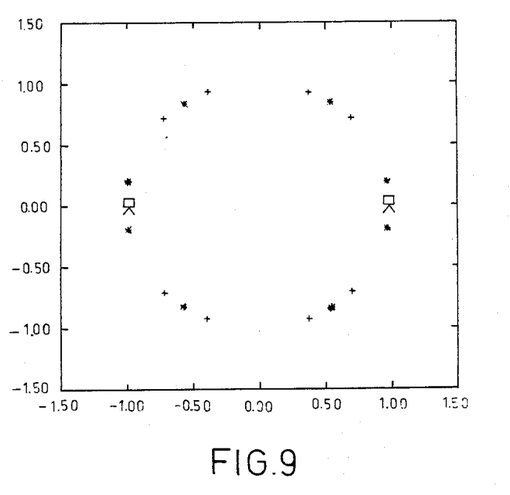
FIG. 9 shows an even phase diagram of a signal transmission method with an optimum frequency pulse according to FIG. 7.
Figure 10:
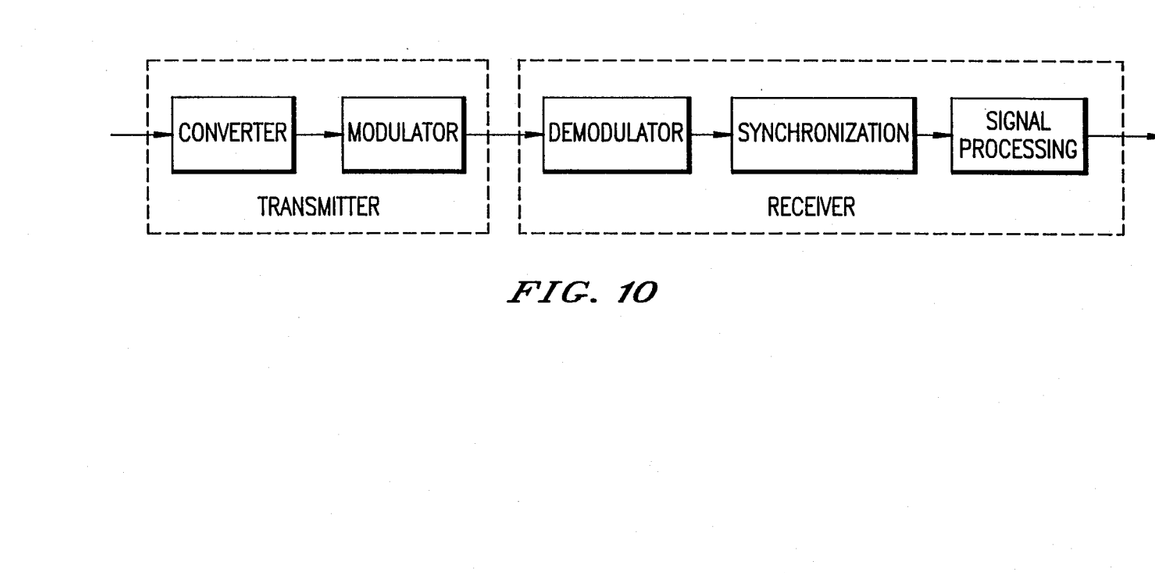
FIG. 10 shows a block diagram of a transmitter communicating with a receiver in the context of the present invention.

FIG. 9 shows the even phase diagram of a frequency baseband signal when the symbols occurring are binary, the modulation index $h=\frac{1}{2}$ and the frequency pulse is of the shape shown in FIG. 7. The following symbols have been used for the frequency of occurrence:

| Symbols in the phase diagram | Frequency of occurrence in events |
|---|---|
| + | 1 |
| o | 2 |
| ■ | 4 |

This phase diagram shows that a power of magnitude $P=2$ is sufficient in the exponentiating circuit 1, assuming the synchronisation of the signal receiver is performed as described in the first illustrative embodiment. It should be noted that such low powers represent a particularly advantageous consequence of the invention since the noise caused by the channel is only slightly raised in relation to the actual signal.

In conclusion, it can be said that, by introducing suitable constraints in the determination of the frequency pulse, a signal transmission method having the characteristics required in each case can be created. A frequency pulse according to the invention has the least dispersion of the interference phase points with given constraints. The invention thus provides a signal transmission method which ensures both great spectral efficiency and a synchronisation of the signal receiver which is immune to interference.

We claim:

1. Method for determining a sampling time to sample a frequency-baseband signal of a received carrier oscillation modulated according to a CPM-method by a sequence of equally distributed and statistically uncorrelated symbols having a symbol duration $T_S$, comprising the steps of:
   (a) demodulating the received carrier oscillation into a frequency-baseband signal;
   (b) sampling the frequency-baseband signal in each subinterval in a number of N successive time windows which have in each case the length of one symbol duration $T_S$ and are divided into K corresponding subintervals;
   (c) separating the values of the sampled frequency-baseband signal into two groups, wherein a first of the two groups contains values that have been sampled in time windows displaced by an even-numbered multiple of the symbol duration referred to a reference time $t_R$ and wherein a second of the two groups contains values that have been sampled in time windows displaced by an odd-numbered multiple of the symbol duration $T_S$ referred to said reference time $t_R$;
   (d) determining K dispersions for at least one of the two groups, wherein each of the dispersions is calculated from the values sampled in subintervals which are separated by an even-numbered multiple of the symbol duration $T_S$ and wherein each of the dispersions therefore is related to the relative position of the corresponding subintervals in the time window; and
   (e) comparing the K dispersions with each other and deriving from the position of the smallest of these dispersions the sampling time within each time window at which sampling time the frequency-baseband signal is to be sampled for recovering the data.

2. Method as claimed in claim 1, wherein the frequency-baseband signal is exponentiated by a power of a magnitude p, such that the sampled values are located in a number p of phase regions at particular times which are periodic with the symbol duration $T_S$, each of the p phase regions containing one basic phase points and several interference phase points, are imaged to a reduced phase region and the p basic phase points are imaged to a reduced phase point.

3. Method as claimed in claim 2, wherein the step of determining K dispersions comprises:
   determining for each sampled value of the same of the two groups a difference between the sampled value and the reduced phase point; and
   squaring and summing the differences of corresponding subintervals.

4. Method as claimed in claim 3, wherein:
   the dispersions are calculated for both of the two groups;
   dispersions belonging to the same subinterval are combined in accordance with their statistic weighting; and
   the combined dispersions are used for determining the sample time $T_A$.

5. Method as claimed in claim 2, wherein the samples values of one of the two groups are displaced by a constant value, such that the reduced basic phase points of the two groups coincide.

6. Method as claimed in claim 2, wherein the CPM-method uses a frequency pulse which maintains the dispersion of the interference phase points with respect to the basic phase points.

7. Method as claimed in claim 6, wherein the CPM-method uses a symmetric frequency pulse of a length greater than the symbol duration $T_S$ and of a power density spectrum G(f), which is efficient in the sense that the spectrum itself and its derivation disappear as absolute values at a frequency of the magnitude $\frac{1}{2}T_S$.

* * * * *